No. 729,694. PATENTED JUNE 2, 1903.
J. K. STEWART.
FLEXIBLE SHAFT.
APPLICATION FILED JULY 20, 1901.
NO MODEL.
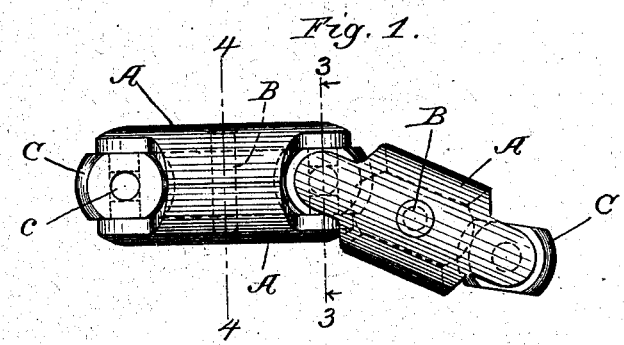
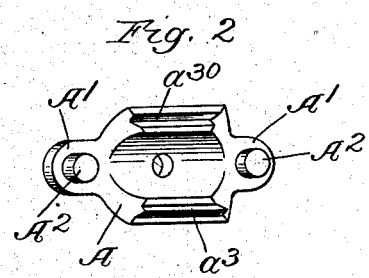
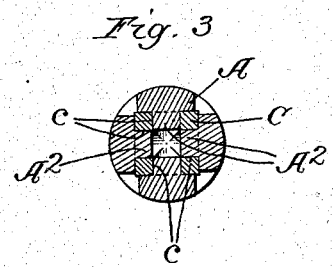
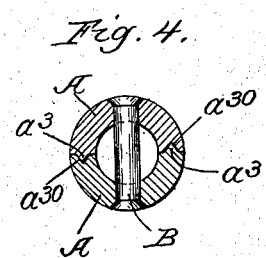
Witnesses.
Edward T. Wray
Edgar L. Conant.
Inventor,
John K. Stewart
by Burton Burton
his Atty's.

No. 729,694. Patented June 2, 1903.

UNITED STATES PATENT OFFICE.

JOHN K. STEWART, OF CHICAGO, ILLINOIS.

FLEXIBLE SHAFT.

SPECIFICATION forming part of Letters Patent No. 729,694, dated June 2, 1903.

Application filed July 20, 1901. Serial No. 69,023. (No model.)

*To all whom it may concern:*

Be it known that I, JOHN K. STEWART, a citizen of the United States, residing at Chicago, in the county of Cook and State of Illinois, have invented certain new and useful Improvements in Flexible Shafts, of which the following is a specification, reference being had to the accompanying drawings, forming a part thereof.

The purpose of this invention is to provide a link and universal joint for a flexible shaft which shall have greater capacity for transmission of power in a given size and greater durability, while at the same time being proportionately cheaper of construction than the forms of such devices in common use.

In the drawings, Figure 1 is an elevation of a portion of a flexible shaft embodying my invention. Fig. 2 is a perspective view of one of the two similar elements of which link is composed. Fig. 3 is a section at the line 3 3 on Fig. 1. Fig. 4 is a section at the line 4 4 on Fig. 1.

The construction which constitutes my invention is such as to permit every wearing part to be hardened and to permit also easy finishing of all the parts which work in contact and reduce to the minimum the work of assembling the parts while facilitating repair.

The shafts comprises two sorts of parts—namely, links and pivot-blocks. The links are each composed of two elements A A identical in form, each being in general a half-cylindrical body having at the ends the flat faces A' A', from the center of which project the studs $A^2 A^2$. The portion of the flat face intermediate the end rabbets is provided with a longitudinal rib $a^3$ and a groove $a^{30}$ parallel with the rib and of corresponding form, the rib and groove being disposed symmetrically about the middle longitudinal line of the face, so that when the two similar elements are placed face to face the rib $a^3$ in one taking into the groove $a^{30}$ of the other the rabbets face each other and the pivot-studs projecting from the rabbets are respectively in line end to end. Each of the elements A is pierced at the middle of its length and width to receive a rivet B, by which the two elements are secured together.

C is the pivot-block. It is square in cross-section, having dimensions adapting it to fit between the rabbet-faces A' A' and having at the center of each of its four lateral faces a pivot-aperture $c$, adapted to receive the pivot pin or stud $A^2$, projecting from the corresponding rabbet-face of the link element. It will be understood that the width of the tongues remaining at the ends of each of the elements A after the same is rabbeted as described is such as to pass between the two lugs at the end of the link formed of similar elements, so that when two links so formed are assembled with a pivot-block C between them two pivot-pins of one of the links taking into two opposite pivot-apertures $c$ of the block while the two pivot-pins of the other link take into the other two opposite apertures a universal joint is formed, having a range of flexure as great as may be desired, at least up to ninety degrees. Both the elements A' of the link are designed to be completely machined as to the flat faces, rabbets, and pivot-pins and hardened before being assembled, the pivot-block C being in like manner finished, apertured, and hardened, and when the parts are assembled the two elements of the links are secured together by a soft rivet B, which is the only soft element in the entire structure, all the elements which are exposed to any wear being easily finished and adapted to be thoroughly hardened before being assembled. The strain imposed upon the shaft in transmitting rotary motion operates upon the rivet only with a tensile strain, except in so far as the torsional action at the joint might tend to turn the two elements of any link about the rivet as a pivot. This is effectually prevented by the engagement of the rib $a^3$ and groove $a^{30}$, with which the abutting faces of the two elements of the link are provided, and by this means the rivet is exposed to only tensile strain and is easily made adequate to endure the strain imposed by the torsion to which the link is subjected in transmitting the maximum power for which the shaft may be otherwise adapted.

I do not limit myself strictly to the specific mode of adapting the two elements of the link to engage with each other so as to be safely secured by the single rivet, the essential characteristic of the construction in this respect being that said two elements shall be adapted to abut stably upon each other at the two faces in contact. Neither do I limit myself strictly to making the two elements precisely similar, though this is the most convenient and economical method of construction; but it will be obvious to any mechanic that the link might be divided longitudinally at other than a medial plane without sacrificing the other points of merit of the structure.

I claim—

1. A flexible-shaft link comprising two similar metal elements formed with faces adapted to abut stably on each other and rabbeted back from such faces at the end portions thereof, and provided with pivot-studs projecting rigidly from the bottom of the rabbets respectively, and suitable means for binding said two elements rigidly together with their corresponding rabbets and pivot-studs facing each other.

2. A flexible-shaft link comprising two elements, each having one side formed with plane faces at the ends and pivot-studs projecting from said plane faces, said elements being adapted to abut stably on each other at an intermediate portion of said sides, one element having a recess and the other a projection adapted to take into said recess when the elements are assembled abutting, and a rivet binding said two elements together.

3. A flexible-shaft link comprising two elements of identical form, having respectively faces adapted to abut stably on each other, rabbeted back from such faces at the end portions thereof, provided with pivot-studs projecting rigidly from the bottom of the rabbets respectively, and at the portion intermediate said rabbets having each at one side a rib and at the other side a recess parallel with the rib and adapted to afford a seat for a like rib, said elements being assembled with the rib of one in the recess of the other, their corresponding pivots in line, and a rivet securing them together thus assembled.

4. In a flexible shaft, links comprising two elements of identical form, having respectively faces adapted to abut stably on each other, and rabbeted back from such faces at the end portions thereof to form gaps in the ends of the links when said elements are secured together with their faces thus abutting, and having in their abutting faces, at one side of the longitudinal medial plane, a projection, and at the other side, in the corresponding position, a recess, adapted to receive the projection, said elements being assembled with the projection of one in the recess of the other, and means for securing them together when thus assembled.

In testimony whereof I have hereunto set my hand, at Chicago, Illinois, in the presence of two witnesses, this 29th day of June, A. D. 1901.

JOHN K. STEWART.

In presence of—
 CHAS. S. BURTON,
 ADNA H. BOWEN, Jr.